(12) United States Patent
Goetheer et al.

(10) Patent No.: US 11,815,307 B2
(45) Date of Patent: Nov. 14, 2023

(54) ENDOTHERMIC SALT REGENERATION FOR COOLING AND AIR-CONDITIONING

(71) Applicant: Nederlandse Organisatie voor toegepast-natuurwetenschappelijk onderzoek TNO, 's-Gravenhage (NL)

(72) Inventors: Earl Lawrence Vincent Goetheer, Mol (BE); Rajat Bhardwaj, Delft (NL); Cornelis Petrus Marcus Roelands, Voorschoten (NL); Adriaan Jan De Jong, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 329 days.

(21) Appl. No.: 16/968,951

(22) PCT Filed: Feb. 18, 2019

(86) PCT No.: PCT/NL2019/050105
§ 371 (c)(1),
(2) Date: Aug. 11, 2020

(87) PCT Pub. No.: WO2019/160418
PCT Pub. Date: Aug. 22, 2019

(65) Prior Publication Data
US 2021/0055029 A1    Feb. 25, 2021

(30) Foreign Application Priority Data

Feb. 16, 2018 (EP) .................................... 18157226

(51) Int. Cl.
*F25D 5/00* (2006.01)
*F28D 20/00* (2006.01)

(52) U.S. Cl.
CPC ............. *F25D 5/00* (2013.01); *F28D 20/003* (2013.01)

(58) Field of Classification Search
CPC ........ F25D 5/00; F28D 20/003; F25B 15/002; F25B 17/10
See application file for complete search history.

(56) References Cited

U.S. PATENT DOCUMENTS

| | | |
|---|---|---|
| 3,977,202 A | 8/1976 | Forusz et al. |
| 4,010,620 A | 3/1977 | Telkes |

(Continued)

OTHER PUBLICATIONS

Kim et al. "Solar refrigeration options—a state-of-the-art review". International Journal of Refrigeration, vol. 31, Issue 1, 2008, pp. 3-15.

(Continued)

*Primary Examiner* — Joseph F Trpisovsky
(74) *Attorney, Agent, or Firm* — Banner & Witcoff, Ltd.

(57) ABSTRACT

The invention is directed to a method and a system for regenerating an endothermic salt composition from an aqueous solution thereof, said method comprising a) contacting a switchable-polarity compound with the aqueous solution of the endothermic salt composition to obtain a raffinate phase and an extract phase, wherein the raffinate phase comprises said endothermic salt composition in a higher concentration than said aqueous solution and said extract phase comprises the switchable-polarity compound and water; and b) separating the raffinate phase and the extract phase into a separated raffinate and a separated extract. The endothermic salt can be used in systems for cooling food, milk, medicines and/or air.

14 Claims, 2 Drawing Sheets

(56) References Cited

U.S. PATENT DOCUMENTS

| | | | | |
|---|---|---|---|---|
| 8,608,696 B1 * | 12/2013 | DiMeo | ............... | A61M 19/00 |
| | | | | 604/113 |
| 2016/0178284 A1 * | 6/2016 | Bataille | ............... | F25B 35/04 |
| | | | | 165/104.12 |

OTHER PUBLICATIONS

Milosevic et al. "Extractive concentration of aqueous salt solutions in aqueous two phase systems, In Desalination", vol. 324, 2013, pp. 99-110.

The emerging cold economy (https://www.carbontrust.com/resources/the-emerging-cold-economy).

Martins et al. "Liquid-Liquid Equilibria of an Aqueous Two-Phase System Containing Poly(ethylene) Glycol 1500 and Sulfate Salts at Different Temperatures", Journal of Chemical and Engineering Data., US, (Jan. 1, 2008), vol. 53, No. 1, doi:10.1021/je700538z, ISSN 0021- 9568, pp. 238-241. XP055494649.

Milosevic. "Extraction based strategies for energy efficient salt concentration", Eindhoven, TU. doi:10.6100/IR760488, (Jan. 1, 2013), URL: https://pure.tue.nl/ws/files/3999130/760488.pdf, (Jul. 29, 2018), [XD] 1,2,10. XP055494357.

\* cited by examiner

ENDOTHERMIC SALT REGENERATION FOR COOLING AND AIR-CONDITIONING

RELATED APPLICATIONS

This application is a National Stage Application under 35 U.S.C. 371 of co-pending PCT application PCT/NL2019/050105 designating the United States and filed Feb. 18, 2019; which claims the benefit of EP application number 18157226.4 and filed Feb. 16, 2018 each of which are hereby incorporated by reference in their entireties.

FIELD OF THE INVENTION

The invention is in the field of endothermic salt composition and use thereof in cooling devices. In particular, the invention is directed to the regeneration of endothermic salt compositions.

BACKGROUND OF THE INVENTION

Endothermic salts, i.e. salts that have the capacity of being endothermically hydrated by dissolution or dilution in water, can be applied to achieve cooling of products such as food, medicines and milk, and air for instance in buildings. The fact that dissolving the salts requires energy in the form of heat that can be extracted from the environment is used to cool the environment. Examples of suitable endothermic salts to this end include $NH_4NO_3$, $NH_4Cl$, $NH_2CONH_2$, $KNO_3$ and the like as these salts can give a cooling effect of up to 200 KJ/kg salt when dissolved in water. In systems and methods that utilize endothermic salts, it is desired that the endothermic salt is regenerated after the cooling is exhausted. This allows the recycling of the salts and reduces the requirement to replenish the system or method with fresh endothermic salts. Overall, this i.a. reduces the energy and cost requirements for operating the system and method.

In U.S. Pat. No. 4,010,620, a cooling method for air conditioning of buildings comprising dissolving a salt in water is described. The recovery of the endothermic salt is carried out by evaporation of the water from the solution with hot air. Drawback of this method includes the fact that the evaporation of water requires large amounts of energy and general a large amount of time, volume and space occupied by the equipment, in particular when the hot air is heated by solar energy. Moreover, continuously operating the system is complex and requires many switches and valves.

It is an object of the present invention to provide a cooling method and device based on endothermic salts, which method and device enable an effective regeneration of the exhausted endothermic salts, preferably in a continuous manner and/or by using solar energy, with easy scalability and no vacuum systems requirements.

SUMMARY OF THE INVENTION

The present inventors surprisingly found that this object can be achieved by utilizing a switchable-polarity compound, which has the property that its polarity can be switch by an inducer such as heat.

A particular type of a switchable-polarity compound, a thermoresponsive polymer or switchable polymeric compound is known for extraction of salts such a NaCl, $Na_2SO_4$ and $FeCl_3$ from brines originating from for instance mines and seawater (see also Milosevic, M. (2013). *Extraction based strategies for energy efficient salt concentration*, Eindhoven: Technische Universiteit Eindhoven DOI: 10.6100/IR760488). The present inventors surprisingly found that this principle can also be applied to the regeneration of endothermic salt compositions in endothermic cooling system and methods.

Accordingly, the present invention is directed to a method for regenerating an endothermic salt composition from an aqueous solution thereof, said method comprising the stages of:

a) contacting a switchable-polarity compound with the aqueous solution of the endothermic salt composition to obtain a raffinate phase and an extract phase, wherein the raffinate phase comprises said endothermic salt composition in a higher concentration than said aqueous solution and said extract phase comprises the switchable-polarity compound and water;

b) separating the raffinate phase and the extract phase into a separated raffinate and a separated extract.

The present method can be applied after the endothermic salt composition has been dissolved in an aqueous solvent and the cooling effect has ceased or at least diminished to a large extent. In that case the salt composition is called exhausted. By contacting the aqueous solution of the endothermic salt composition and the switchable-polarity compound, a multiphasic system (typically a biphasic system) is obtained of which one phase comprises water and the majority of the switchable-polarity compound (i.e. the extract phase) and another phase comprises water and the majority of the endothermic salt composition (i.e. the raffinate phase). Since the phase comprising the majority of the switchable-polarity compound also comprises water, which water at least partially originates from the aqueous solution of the endothermic salt composition, the concentration of the salt composition in the raffinate phase is higher than in the aqueous solution of the endothermic salt composition. In other words, water is extracted from the aqueous solution of the endothermic salt composition by the switchable-polarity compound. By separating the raffinate phase and the extract phase into a separated raffinate and a separated extract, the salt composition is regenerated as the separated raffinate. The separated raffinate can be recombined with water to effectuate a further or a repeated cooling.

With aqueous solution of the salt composition is meant that the solution comprises at least partially dissolved salt composition. Although possible, it is not required that the salt composition is entirely dissolved. Furthermore, the term aqueous indicates that the solution comprises at least water. Other solvents or liquids that may be present in the aqueous solution include for instance alcohols such as ethanol and/or glycerol.

Regeneration herein means that the salt composition regains at least part of its capacity to endothermically be hydrated.

Typically, contacting the aqueous solution of the endothermic salt composition and the switchable-polarity compound is carried out at or near room temperature, such as in the range of 10 to 40° C. At this temperature, the switchable-polarity compound is relatively polar compared to its polarity at higher temperature. This property can be advantageously used to regenerate the switchable-polarity compound for recycling.

Accordingly, the present method preferably further comprises regenerating the switchable-polarity compound by:

c) heating the separated extract to obtain an aqueous phase and a switchable-polarity compound phase, and d) separating said aqueous phase and switchable-polarity compound phase into a separated aqueous phase and a separated switchable-polarity compound phase.

To induce the phase separation into the aqueous phase and the switchable-polarity compound phase, the separated extract is preferably heated to a temperature in the range of 40 to 100° C., more preferably in the range of 50 to 70° C. such as about 60° C. Heating the separated extract to this temperature can be carried out with heat from a solar thermal collector, which is preferred.

As described above, the switchable-polarity compound (herein also referred to as simply the compound) comprises the property of having a higher polarity (i.e. higher affinity for water) at low temperature compared to its polarity at higher temperature. Such a property can typically be found in polymeric compounds. Generally, any type of switchable-polarity compound can suitably be used in the present invention, but a large difference in polarity at a certain temperature difference is preferred as it is most effective to regenerate the compound. Moreover, it is preferred that the polarity of the compound is high at the temperature at which it is contacted with the aqueous solution of the salt composition such that dehydration of the aqueous solution of the salt composition is optimal. However, its polarity should not be too high such that contacting the compound with the aqueous solution of the salt composition does not result in the aforementioned multiphasic system. Accordingly, the compound preferably comprises a switchable polymeric compound, since polymeric compounds generally show good phase separation properties. Preferred switchable polymeric compounds are disclosed in Milosevic, M. (2013). *Extraction based strategies for energy efficient salt concentration*, Eindhoven: Technische Universiteit Eindhoven DOI: 10.6100/IR760488, which is incorporated herein in its entirety.

The switchable-polarity properties of a given compound can be determined by conventional experimentation. For instance, a certain compound can be combined with an aqueous solvent to form a biphasic system at a certain temperature. Next, after increasing the temperature, the partition of water between the two phases can be compared with the partition of water at the lower temperature.

DETAILED DESCRIPTION OF THE INVENTION

Figure 1:
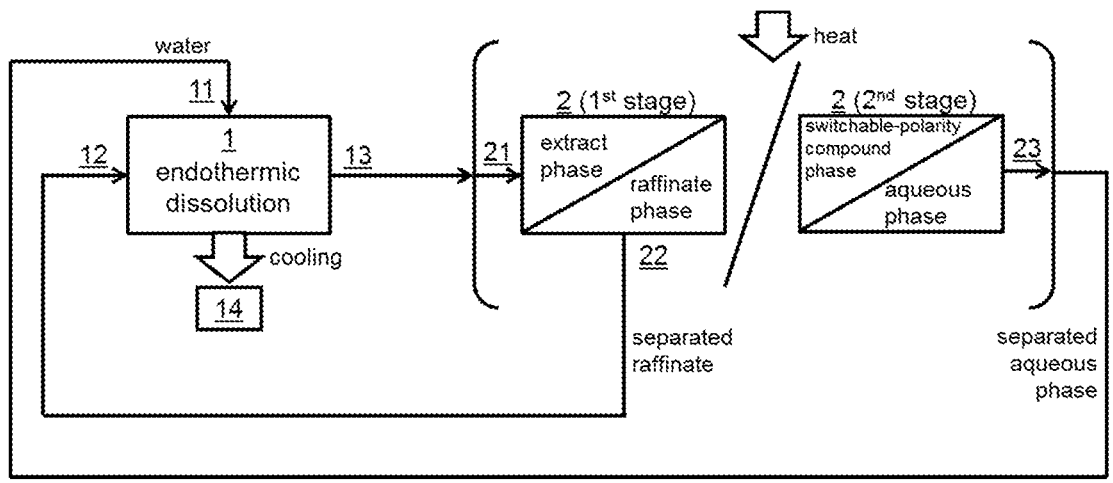
FIG. 1 illustrates a particular embodiment of a system suitable for carrying out the method of the present invention including stages a)-d) in a step-wise manner.

In a preferred embodiment, the switchable polymeric compound is selected from the group consisting of polyethylene glycol (PEG), polypropylene glycol (PPG), block-copolymer of PEG and PPG, in particular poloxamers, poly(tetramethyleenether)glycol, poly(vinyl alcohol), polyvinyl pyrrolidone (PVP), polyethylenimine, poly(diallyclimethyl ammonium chloride), octylphenol ethoxylate, dialkyl sulfosuccinate such as dioctyl sulfosuccinate, sorbitan monostearate, alkoxylated fatty alcohol such as $C_{16-18}$ fatty alcohol-$(EO)_{10}$, $C_{12}$ fatty alcohol-$(EO)_5(PO)$, $C_{12}$ fatty alcohol-$(EO)_4(PO)_5$, $C_{12}$ fatty alcohol-$(EO)_2(PO)_4$, fatty alcohol alkoxylate mixture, coleyl cetyl alcohol polyglycol ether, $C_{12}$ fatty alcohol-$(EO)_{10}C_4H_9$, 2-hexyldecanol-$(EO)_2$, $C_{12}$ fatty alcohol-$(EO)_2$, poly(acrylic acid) partial sodium salt-graft-poly((EO)), O,O'-Bis(2-aminopropyl) polypropylene glycol-block-polyethylene glycol-block-polypropylene glycol, hyperbranched bis-dimethylolpropionic acid (MPA), polyester hydroxyl amine or functionalized polyester hydroxyl amine, and combinations thereof.

Most preferable, the switchable polymeric compound comprises poloxamers as these compounds give particularly good results and have particularly favorable polarity properties. For instance, poloxamers can concentrate a typical aqueous solution of the salt composition up to 7.7 times, or even more. Poloxamers are nonionic triblock copolymers comprising a central hydrophobic chain of polyoxypropylene (also knowns as polypropylene oxide)) flanked by two hydrophilic chains of polyoxyethylene (also knowns as poly(ethylene oxide)). Several poloxamers are commercially available under the trade names Synperonics™, Pluronics™ and/or Kolliphor™.

In a particular embodiment of the present invention, the method comprises a heat exchange between the separated extract and the aqueous liquid. As described herein-above, the aqueous liquid is obtained by heating the separated extract. In a further aspect of the present invention (vide infra), the resulting aqueous liquid can be used to dissolve and/or dilute an endothermic salt composition in order to achieve a cooling effect. For a more effective cooling (i.e. cooling to a lower temperature), it is accordingly preferred that the aqueous liquid is of a lower temperature than the temperature at which it was obtained (i.e. at the temperature of regenerating the polarity-switchable compound). Accordingly, in a preferred embodiment, the undesired heat of the aqueous liquid can be exchanged with the separated extract. This is also advantageous since the heat provided to the separated extract can accordingly be used to induce phase separation to the switchable-polarity compound phase and the aqueous phase. Alternatively, or additionally, the method comprises a heat exchange between the separated extract and the separated switchable-polarity compound phase. This provides similar advantages.

In U.S. Pat. No. 9,039,924, several endothermic salts have been disclosed which can be suitably applied in the present invention. Preferably, the endothermic salt composition preferably comprises an endothermic salt selected from the group consisting of sodium nitrite, ammonium nitrate, potassium nitrite, ammonium chloride, potassium chloride, ammonium phosphate and combinations thereof. The preferable selection of the salts may depend on the environment (i.e. climate) where or the purpose for which the invention is carried out. For instance, a composition based on $KNO_3$ has a higher cooling power than a composition based on $NH_4Cl$ and may be used to lower a temperature of about 45° C. to about 20° C. On the other hand, a composition comprising $NH_4Cl$ can suitably be used to lower a temperature of about 20° C. to 5° C. Even lower temperatures can be reached with for instance $NH_4NO_3$, which is capable of decreasing a temperature of about 20° C. to about −5° C.

Even more lower temperatures such as −15° C. can be reached by combining several salts in sub-stages. For instance, in a first stage, a temperature of 20° C. can be lowered to about 0° C. with a salt composition comprising $NH_4Cl$ and $NH_4NO_3$, which stage is followed by a second stage of utilizing a second salt composition comprising mostly $NH_4NO_3$ to lower the temperature to −15° C. Accordingly, the endothermic salt composition may comprise at least two endothermic salts and the stage of contacting the endothermic salt composition may comprise at least two sub-stages.

Another aspect of the present invention is directed to a method of operating an endothermic cooling system, in particular said system for cooling of food, milk and/or air in buildings. Said method comprises:

e) contacting the endothermic salt composition with water to obtain an aqueous solution of the endothermic salt composition and to generate cooling;
followed by regenerating the endothermic salt composition from the aqueous solution thereof in the method as described herein.

A preferred embodiment of the method of operating an endothermic cooling system further comprises recycling the endothermic salt composition in the separated raffinate into stage e) of contacting said endothermic salt composition with water. Alternatively or additionally, the method further comprises recycling of the switchable-polarity compound in the separated extract phase into stage c) of contacting the switchable-polarity compound with the aqueous solution of the endothermic salt composition. Similarly, the method may further comprise recycling of the water in the separated extract phase into the stage of contacting the endothermic salt composition with water. These recycling options, which can be independently applied, provide a more complete and efficient system and method.

The present method, and in particular the method including the stage of regenerating the switchable-polarity compound can be carried out step-wise or continuous. Preferably, the method is carried out continuous since this requires minimal interference with the method by the user and can allow autonomous and automated operations. Moreover, a continuous process enables the method to be carried out in a closed system, in particular in a closed system under atmospheric pressure. This allows a facile operation with minimum maintenance requirements and energy demands, which is particularly beneficial in remote locations in developing countries.

A further aspect of the present invention is directed to an endothermic cooling system which is adapted to carry out the method of the present invention. Such system is illustrated in FIGS. 1-5 and typically comprises an endothermic salt composition compartment (1) adapted such that an endothermic salt composition can be contact with water therein, said endothermic salt composition compartment comprising an extract inlet (11), a raffinate inlet (12) and an exhausted salt composition outlet (13);

an optional cooling compartment (14) that is thermally connected to the endothermic salt composition compartment, preferably thermally connected by a first heat exchanger adapted to transfer heat fluid from said cooling compartment to the endothermic salt composition compartment and/or to transfer a cooling fluid from said endothermic salt composition compartment to said cooling compartment;

a first liquid-liquid separation device (2) comprising an optional heating device, an exhausted salt composition inlet (21) that is connected to the exhausted salt composition outlet (13), a raffinate outlet (22) that is connected to the raffinate inlet (12), and a liquid outlet (23) that is optionally connected to the extract inlet (11).

In FIG. 1, a particular embodiment of the system is illustrated that is particularly suitable for carrying out the method of the present invention including stages a)-d) in a step-wise manner. In this system, the recovery of the salt composition in the form of the separated raffinate (stages a and b) and the recovery of the polarity-switchable compound (stages c and d) can be carried out in the same liquid-liquid separation device (2). This system can be operated by first carrying out the recovery of the salt by removing only the separated raffinate from the liquid-liquid separation device (2) and recycling it into the endothermic salt composition compartment (1) while retaining the separated extract in the liquid-liquid separation device (2). In a next (discontinuous) stage, the temperature in the liquid-liquid separation device (2) can be raised to obtain an aqueous phase and a switchable-polarity compound phase (stage c). Then, the aqueous phase can be removed from the liquid-liquid separation device (2) (stage d) and optionally recycled into the endothermic salt composition compartment (1) as well.

Figure 2:
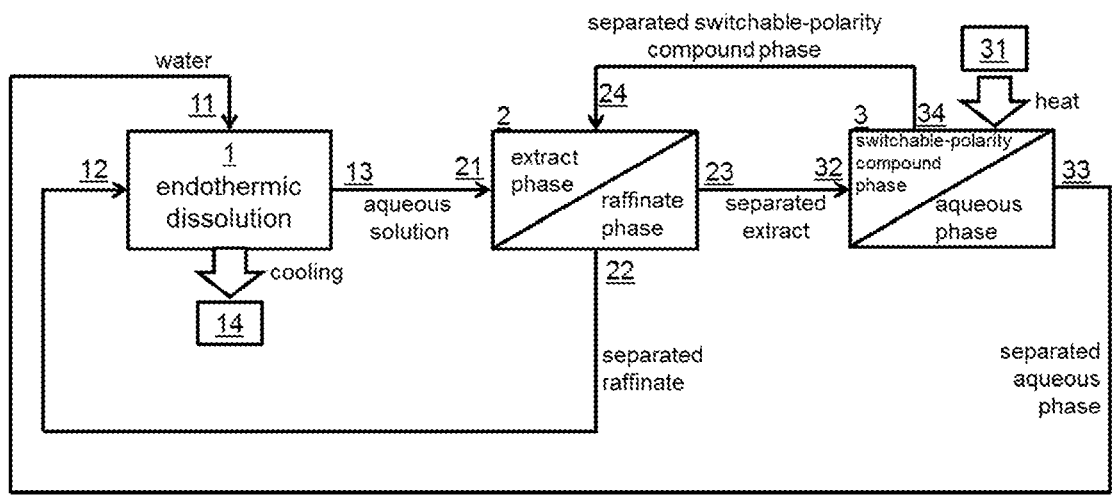
FIG. 2 illustrates a preferred embodiment of a system suitable for carrying out the method of the present invention in a continuous manner.

An alternative and preferred embodiment, as illustrated in FIG. 2, involves a system that is particularly suitable for carrying out the method of the present invention in a continuous manner. This system, typically further comprises a second liquid-liquid separation device (3) that comprises a heating device (31), a liquid inlet (32) that is connected to the liquid outlet (23) of the first liquid-liquid separation device (2), an aqueous phase outlet (33) and a switchable-polarity compound phase outlet (34), wherein said aqueous phase outlet (33) is connected to the extract inlet (11) of the endothermic salt composition compartment, and wherein the switchable-polarity compound phase outlet (34) is connected to a switchable-polarity compound inlet (24) of the first liquid-liquid separation device (2). This system is adapted to continuously carry out stages a-e, which can be illustrated as follows.

The heater device 31 preferably comprises a solar thermal collector.

To the first liquid-liquid separation device (2), the aqueous solution of the salt composition and separated switchable-polarity compound phase can be continuous fed through the exhausted salt composition inlet (21) and switchable-polarity compound inlet (24) respectively. In the first liquid-liquid separation device (2), the water can be extracted from the aqueous solution of the salt composition by the switchable-polarity compound resulting in the raffinate and extract phases. These phases can be separated by separately leading them out of the first liquid-liquid separation device (2), as the separated raffinate and separated extract respectively, through the raffinate outlet (22) and the liquid outlet (23) respectively. The separated raffinate can be recycled into the endothermic salt composition compartment (1) via inlet 12, while the separated extract can be fed into the second liquid-liquid separation device through the liquid inlet (32). The second liquid-liquid separation device can be maintained at an elevated temperature (typically in the range as described herein-above for stage c)) to obtain an aqueous phase and a switchable-polarity compound phase. These phases can be separately led out of the second liquid-liquid separation device through the switchable-polarity compound phase outlet (33) and the aqueous phase outlet (33). The separated aqueous phase and separated switchable-polarity compound phase can be recycled into the endothermic salt composition compartment (1) and first liquid-liquid separation device (2) respectively through the appropriate inlets 11 and 24. Thus, stage e) can be continuously carried out in the endothermic salt composition compartment (1), stages a) and b) in the first liquid-liquid separation device and stages c) and d) in the second liquid-liquid separation device.

Figure 3:
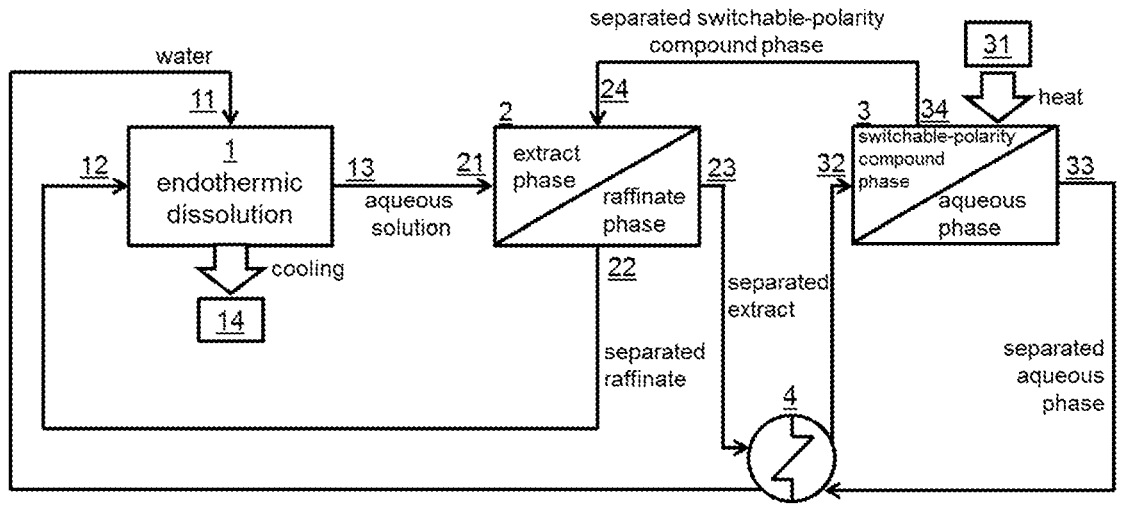
FIG. 3 illustrates the endothermic cooling system of FIG. 2, further comprising a second heat exchanger connected to the liquid outlet and the liquid inlet, as well as to the aqueous outlet and extract inlet.
Figure 4:
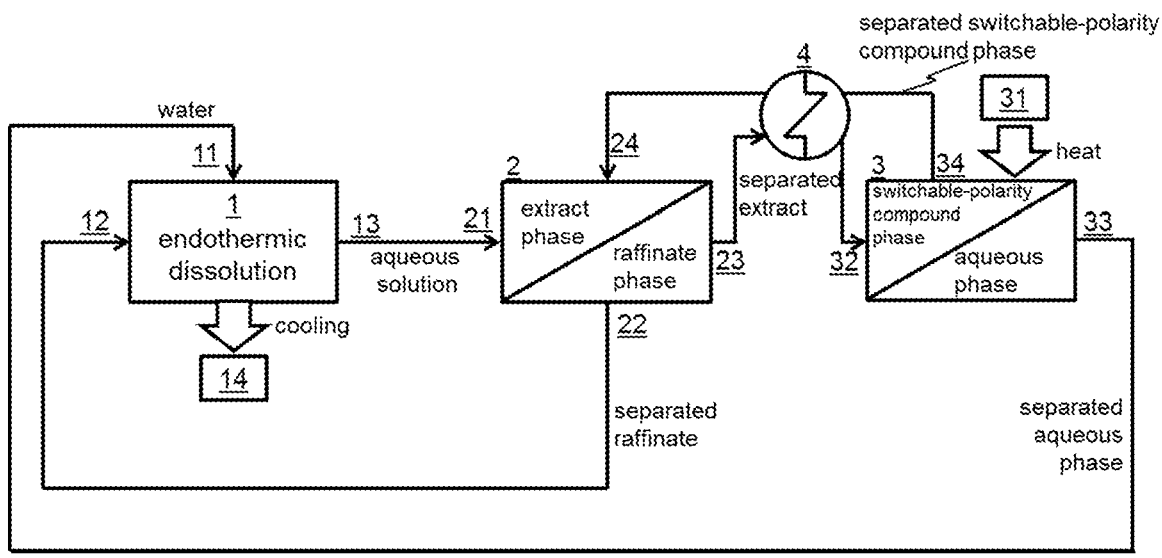
FIG. 4 illustrates the endothermic cooling system of FIG. 2, further comprising a second heat exchanger connected to the liquid outlet and the liquid inlet, as well as to the switchable-polarity compound phase outlet and the switchable-polarity compound inlet.
Figure 5:
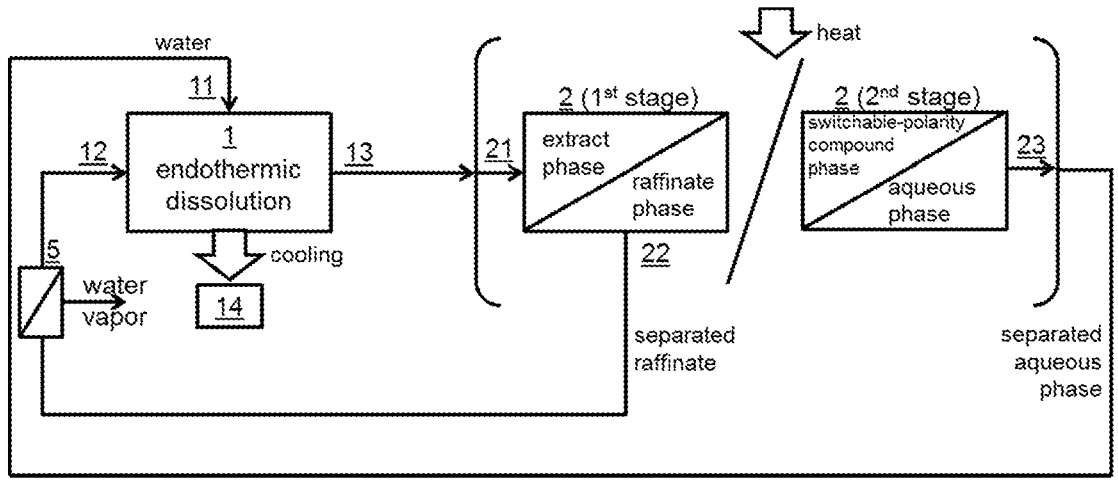
FIG. 5 illustrates a particular embodiment wherein the separated raffinate is further concentrated in an evaporator device.

In particular embodiments, as illustrated in FIGS. 3 and 4, the endothermic cooling system as illustrated in FIG. 2 additionally comprises a second heat exchanger (4) connected to the liquid outlet (23) and the liquid inlet (32), as well as to the aqueous phase outlet (33) and extract inlet (11) (see FIG. 3) and/or to the switchable-polarity compound phase outlet (34) and the switchable-polarity compound inlet (24) (see FIG. 4). The second heat exchanger is adapted such that, during operation, heat can be exchanged between the separated extract phase streaming from the liquid outlet (23) to the liquid inlet (32) and the separated aqueous phase streaming from the aqueous phase outlet (33) to the extract inlet (11) or such that, during operation heat can be exchanged between the, the separated extract phase streaming from the liquid outlet (23) to the liquid inlet (23) and the separated switchable-polarity compound phase streaming from the switchable-polarity compound phase outlet (34) to the switchable-polarity compound inlet (24), or a combination thereof In another particular embodiment of the present invention, the separated raffinate is further concentrated in an evaporator device (5), as illustrated in FIG. 5. Preferably, the concentration is carried out under atmospheric pressure by heating the separated raffinate.

As used herein, the term "and/or" includes any and all combinations of one or more of the associated listed items. It will be understood that the terms "comprises" and "comprising" specify the presence of stated features but do not preclude the presence or addition of one or more other features.

For the purpose of clarity and a concise description features are described herein as part of the same or separate embodiments, however, it will be appreciated that the scope of the invention may include embodiments having combinations of all or some of the features described.

The invention claimed is:

1. A method of operating an endothermic cooling system, said method comprising:
    contacting an endothermic salt composition with water to obtain an aqueous solution of the endothermic salt composition and to generate cooling; and
    regenerating the endothermic salt composition from the aqueous solution thereof comprising the steps of
    contacting a switchable-polarity compound with the aqueous solution of the endothermic salt composition to obtain a raffinate phase and an extract phase, wherein the raffinate phase comprises said endothermic salt composition in a higher concentration than said aqueous solution and said extract phase comprises the switchable-polarity compound and water; and
    separating the raffinate phase and the extract phase into a separated raffinate and a separated extract.

2. The method in accordance with claim 1, further comprising recycling the endothermic salt composition in the separated raffinate into the phase of contacting said endothermic salt composition with water.

3. The method in accordance with claim 1, further comprising recycling of the switchable-polarity compound in the separated extract phase into the phase of contacting the switchable-polarity compound with the aqueous solution of the endothermic salt composition.

4. The method in accordance with claim 1, further comprising recycling of the water in the separated extract phase into the phase of contacting the endothermic salt composition with water.

5. The method in accordance with claim 1, wherein the endothermic salt composition comprises an endothermic salt selected from the group consisting of sodium nitrite, ammonium nitrate, potassium nitrite, ammonium chloride, potassium chloride, ammonium phosphate and combinations thereof.

6. The method in accordance with claim 1, wherein the switchable-polarity compound comprises a switchable polymeric compound.

7. The method in accordance with claim 1, which method is carried out in a closed system.

8. The method in accordance with claim 1, wherein the endothermic salt composition comprises at least two endothermic salts and wherein phase e) of contacting the endothermic salt composition with water comprises at least two sub-phases.

9. The method in accordance with claim 1, wherein the switchable-polarity compound comprises a switchable polymeric compound selected from the group consisting of polyethylene glycol (PEG), polypropylene glycol (PPG), block-copolymer of PEG and PPG, in particular poloxamers, poly(tetramethyleenether)glycol, poly(vinyl alcohol), polyvinyl pyrrolidone (PVP), polyethylenimine, poly(diallydimethyl ammonium chloride), octylphenol ethoxylate, dialkyl sulfosuccinate such as dioctyl sulfosuccinate, sorbitan monostearate, alkoxylated fatty alcohol such as $C_{16-18}$ fatty alcohol-$(EO)_{10}$, $C_{12}$ fatty alcohol-$(EO)_{5}(PO)$, $C_{12}$ fatty alcohol-$(EO)_{4}(PO)_{5}$, $C_{12}$ fatty alcohol-$(EO)_{2}(PO)_{4}$, fatty alcohol alkoxylate mixture, oleyl cetyl alcohol polyglycol ether, $C_{12}$ fatty alcohol-$(EO)_{10}C_{4}H_{9}$, 2-hexyldecanol-$(EO)_{2}$, $C_{12}$ fatty alcohol-$(EO)_{2}$, poly(acrylic acid) partial sodium salt-graft-poly((EO)), O,O'-Bis(2-aminopropyl) polypropylene glycol-block-polyethylene glycol-block-polypropylene glycol, hyperbranched bis-dimethylolpropionic acid (MPA), polyester hydroxyl amine or functionalized polyester hydroxyl amine, and combinations thereof.

10. The method in accordance with claim 1, wherein the switchable-polarity compound comprises poloxamers.

11. The method in accordance with claim 1, regenerating the endothermic salt composition from the aqueous solution carried out in a closed system under atmospheric pressure.

12. The method in accordance with claim 1, wherein said method further comprises:
    heating the separated extract to obtain an aqueous phase and a switchable-polarity compound phase, and
    separating said aqueous phase and switchable-polarity compound phase into a separated aqueous phase and a separated switchable-polarity compound phase.

13. The method in accordance with the claim 12, wherein the heating is carried out with heat from a solar thermal collector.

14. The method in accordance with claim 12, comprising a heat exchange between the separated extract and the aqueous liquid, and/or a heat exchange between the separated extract and the switchable-polarity compound phase.

* * * * *